United States Patent
Yoon et al.

(10) Patent No.: US 10,411,294 B2
(45) Date of Patent: Sep. 10, 2019

(54) ELECTROLYTE LAYER FOR ALL-SOLID STATE BATTERY AND METHOD OF MANUFACTURING ALL-SOLID STATE BATTERY USING THE SAME

(71) Applicants: Hyundai Motor Company, Seoul (KR); Kia Motors Corporation, Seoul (KR); Industry-University Cooperation Foundation Hanyang University, Seoul (KR)

(72) Inventors: Yong Sub Yoon, Seoul (KR); Hong Seok Min, Gyeonggi-do (KR); Kyung Su Kim, Gyeonggi-do (KR); Oh Min Kwon, Busan (KR); Dong Wook Shin, Gyeonggi-do (KR); Sung Woo Noh, Seoul (KR); Lak Young Choi, Seoul (KR)

(73) Assignees: Hyundai Motor Company, Seoul (KR); Kia Motors Corporation, Seoul (KR); Industry-University Cooperation Foundation Hanyang University, Seoul (KR)

( * ) Notice: Subject to any disclaimer, the term of this patent is extended or adjusted under 35 U.S.C. 154(b) by 167 days.

(21) Appl. No.: 15/181,569

(22) Filed: Jun. 14, 2016

(65) Prior Publication Data

US 2017/0133710 A1 May 11, 2017

(30) Foreign Application Priority Data

Nov. 11, 2015 (KR) .................. 10-2015-0158361

(51) Int. Cl.
*H01M 10/0562* (2010.01)
*H01M 10/0585* (2010.01)
(Continued)

(52) U.S. Cl.
CPC .......... *H01M 10/0562* (2013.01); *C08J 5/22* (2013.01); *H01M 4/043* (2013.01);
(Continued)

(58) Field of Classification Search
CPC ........ H01M 10/0562; H01M 10/0585; H01M 10/4235
See application file for complete search history.

(56) References Cited

U.S. PATENT DOCUMENTS 7,892,677 B2     2/2011  Shirane et al.
2007/0015060 A1* 1/2007  Klaassen ............... H01B 1/122
                                                   429/309
(Continued)

FOREIGN PATENT DOCUMENTS

JP  2007/066703 A   3/2007
KR  2013-0071365 A  6/2013
KR  2015-0060517 A  6/2015

*Primary Examiner* — Karie O'Neill Apicella
(74) *Attorney, Agent, or Firm* — Mintz Levin Cohn Ferris Glovsky and Popeo, P.C.; Peter F. Corless (57) ABSTRACT

Disclosed is a method of manufacturing an all-solid state battery. The method includes coating a first slurry or composition having on a substrate to form a first electrolyte layer a predetermined thickness, coating a second slurry or composition on the first electrolyte layer to form a second electrolyte layer having a predetermined thickness, laminating an electrode layer on the second electrolyte layer, bonding the electrode layer to the second electrolyte layer through pressing, and removing the substrate from the first electrolyte layer. The first slurry or composition of the first electrolyte layer has content of a binder less than that of the second slurry or composition of the second electrolyte layer, and thus, the substrate may be easily removed from the first electrolyte layer.

10 Claims, 7 Drawing Sheets

(51) Int. Cl.
*C08J 5/22* (2006.01)
*H01M 4/04* (2006.01)

(52) U.S. Cl.
CPC ..... *H01M 4/0407* (2013.01); *H01M 10/0585* (2013.01); *H01M 2220/20* (2013.01); *H01M 2300/0065* (2013.01); *H01M 2300/0085* (2013.01)

(56) References Cited

U.S. PATENT DOCUMENTS

| | | |
|---|---|---|
| 2007/0048617 A1 | 3/2007 | Inda |
| 2011/0162198 A1 | 7/2011 | Kawamoto et al. |
| 2011/0223487 A1* | 9/2011 | Johnson .............. H01M 4/0471 429/319 |
| 2014/0004257 A1 | 1/2014 | Kubo et al. |

\* cited by examiner

ELECTROLYTE LAYER FOR ALL-SOLID STATE BATTERY AND METHOD OF MANUFACTURING ALL-SOLID STATE BATTERY USING THE SAME

CROSS-REFERENCE TO RELATED APPLICATION

This application is based on and claims the benefit of priority to Korean Patent Application No. 10-2015-0158361, filed on Nov. 11, 2015, in the Korean Intellectual Property Office, the disclosure of which is incorporated herein in its entirety by reference.

TECHNICAL FIELD

The present invention relates to an all-solid state battery that may include an electrolyte layer, and a method of manufacturing an all-solid state battery using the same. In particular, the all-solid state battery may obtain secured quality by stabilized laminating between the electrolyte layer and an electrode layer.

BACKGROUND

An all-solid state battery includes a solid electrolyte replacing polymer electrolyte to improve chemical stability and solve a problem such as liquid leakage or ignition.

In the all-solid state battery, an electrode layer and an electrolyte layer may be increased in thickness to enhance characteristics of a solid electrolyte and increase energy density.

In order to increase the thickness of the electrode layer and the electrolyte layer, various manufacturing methods for an all-solid state battery by laminating the electrolyte layer and the electrode layer have been used.

For example, in the related arts, a method of manufacturing an all-solid state battery has been reported. Solid electrolyte slurry having a predetermined thickness is coated on a substrate such as a sheet or a film and dried to form an electrolyte layer, and the electrolyte layer has the substrate attached to one surface thereof. A positive electrode layer or a negative electrode layer is laminated on the other surface of the electrolyte layer and subsequently bonded through pressing. Thereafter, the substrate attached to one surface of the electrolyte layer is removed and an electrode layer having the opposite polarity may be bonded to one surface of the electrolyte layer through pressing. However, in the related art method of manufacturing an all-solid state battery, the substrate may not be smoothly delaminated from the one surface of the electrolyte layer, and thus, quality may not be secured and an interface between the electrolyte layer and the electrode layer is damaged.

SUMMARY

In preferred aspects, the present invention provides an electrolyte for an all-solid state battery. In one aspect, the electrolyte may comprise two or more electrolyte layers having different contents of binders. In preferred aspects, such different multiple electrolyte layers can allow a substrate to be smoothly removed from the electrolyte layers and an interface to be smoothly formed between the electrolyte layer and an electrode layer when a laminating technique is applied. In another aspect, the present invention provides a method of manufacturing the electrolyte for the all-solid state battery using the same.

In one aspect, an electrolyte layer for an all-solid state battery includes: two or more electrolyte layers each having different binders. For instance, two or more electrolyte layers each may have different binders, such as in concentration and/or amount thereof, or in types of the binders, or all of those concentration/amounts or types.

Accordingly, the two or more electrolyte layers may differ, for example, (1) by types of the binder (2) by concentration and/or amount of binders in each layer, (3) by types of electrolytes, or (4) by all of above.

The two or more electrolyte layers may have different thicknesses.

Each of the two or more electrolyte layers may comprise a binder and a solid electrolyte, and may be prepared (1) a binder solution prepared by mixing the binder and a solvent and (2) a slurry having the solid electrolyte. In the binder solution, the solvent may not react to the solid electrolyte.

In an exemplary embodiment, the electrolyte for an all-solid state battery may comprise a first electrolyte layer and a second electrolyte layer. The first electrolyte layer may comprise a first binder and a first solid electrolyte, and the second electrolyte may comprise a first binder and a second electrolyte.

The first electrolyte layer may be prepared by mixing a first binding solution comprising the first binder and a first solvent, and a first slurry or composition comprising the first solid electrolyte. Likewise, the second electrolyte layer may be prepared by mixing a second binding solution comprising the second binder and a second solvent, and a second slurry or composition comprising the second solid electrolyte.

According to another exemplary embodiment of the present invention, a method of manufacturing an all-solid state battery may comprises steps of: coating a first composition or slurry on a substrate to form a first electrolyte layer having a thickness (t1); coating a second composition or slurry on the first electrolyte layer to form a second electrolyte layer having a thickness (t2); laminating an electrode layer on the second electrolyte layer; and bonding the electrode layer to the second electrolyte layer which may include applying a pressure; and removing the substrate from the first electrolyte layer.

Preferably, in one aspect, a content of a first binder included in the first slurry or composition of the first electrolyte layer may be less than a content of a second binder included in the second slurry or composition of the second electrolyte layer.

A thickness of the first electrolyte layer (t1) may be less than that of the second electrolyte layer (t2). For instance, in certain aspects, the differential in thickness between the two layers, i.e. t1 and t2, suitably may be from 0.5 μm to 30 μm or from 50 μm to 80 μm. The first composition or slurry suitably may be coated on the substrate by electrospray deposition, or other procedure.

The second composition or slurry may be coated on the first electrolyte layer by any one coating technique such as die coating, comma coating, and Gravure coating.

After the substrate delaminating operation, an additional electrode layer opposite polarity to the electrode layer bonded to the second electrolyte layer may be bonded to the first electrolyte layer. Accordingly, when the electrode layer is a positive electrode, after removing the substrate from the first electrolyte layer, an additional electrode layer of a negative electrode may be laminated to the first electrolyte layer from which the substrate is removed. When the electrode layer is a negative electrode, after removing the substrate from the first electrolyte layer, an additional electrode layer of a positive electrode may be laminated to the first electrolyte layer from which the substrate is removed.

Further provided in the present invention is a vehicle that comprises the all-solid state battery as described herein. Also provided in the present invention is vehicle that may comprise the all-solid state battery manufactured by the method as described herein.

Other aspects of the invention are disclosed infra.

BRIEF DESCRIPTION OF THE DRAWINGS

The above and other objects, features and advantages of the present invention will be more apparent from the following detailed description taken in conjunction with the accompanying drawings.

DETAILED DESCRIPTION

Hereinafter, exemplary embodiment of the present invention will be described in detail with reference to the accompanying drawings. For reference, dimensions of elements or thicknesses of lines illustrated in the drawings referred to describe the present invention may be exaggerated for the convenience of understanding. Also, the terms used henceforth have been defined in consideration of the functions of the present invention, and may be altered according to the intent of a user or operator, or conventional practice. Therefore, the terms should be defined on the basis of the entire content of this specification.

The terminology used herein is for the purpose of describing particular embodiments only and is not intended to be limiting of the invention. As used herein, the singular forms "a", an and the are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Figure 1:
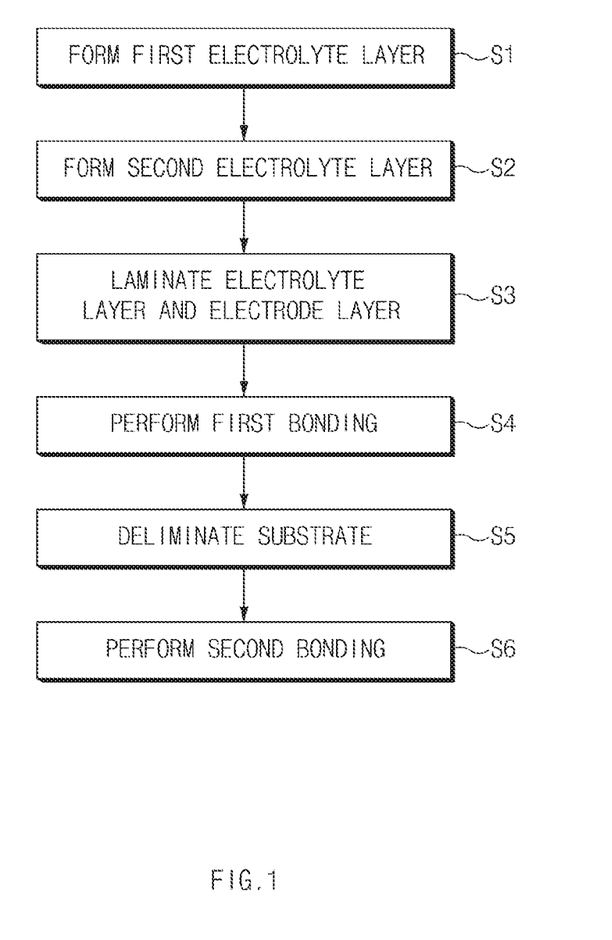
FIG. 1 shows an exemplary method of manufacturing an all-solid state battery according to an exemplary embodiment of the present invention.

FIG. 1 is a flow chart illustrating a method of manufacturing an all-solid state battery according to an exemplary embodiment of the present invention.

As shown in FIG. 1, the method of manufacturing an all-solid state battery according to an exemplary embodiment may include a first electrolyte layer forming operation (S1) of forming a first electrolyte layer 21 on a substrate 10, a second electrolyte layer forming operation (S2) of forming a second electrolyte layer 22 on the first electrolyte layer 21, a laminating operation (S3) of laminating an electrode layer 31 on the second electrolyte layer 22, a first bonding operation (S4) of bonding the electrode layer 31 to the second electrolyte layer 22, a substrate removing operation (S5) of removing the substrate 10 from the first electrolyte layer 21, and a second bonding operation (S6) of bonding an opposite electrode layer 32 to the first electrolyte layer 21 from which the substrate 10 is removed.

Forming First Electrolyte Layer

Figure 2:
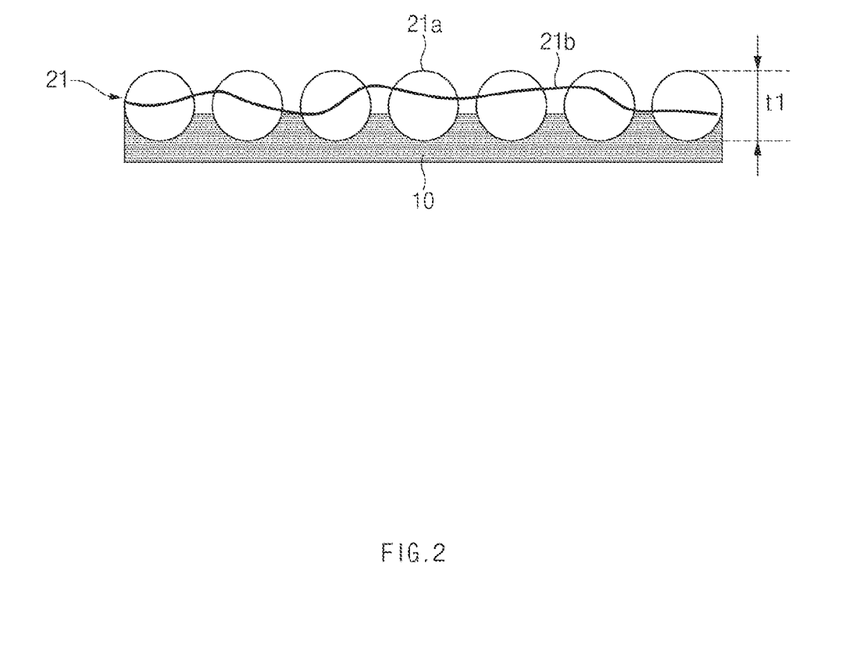
FIG. 2 shows an exemplary process of forming a first electrolyte layer in a method of manufacturing an all-solid state battery according to an exemplary embodiment of the present invention.

As shown in FIG. 2, in operation S1, a first composition or slurry may be coated on the substrate 10 and dried to form the first electrolyte layer 21 having a thickness (t1).

The first composition or slurry may include a first electrolyte in a form of a sold powder state and a first binder solution, and the first binder solution may suitably be prepared by mixing a first binder and a first solvent. Thus, in one aspect, the first electrolyte layer 21 may be formed as electrolyte particles 21a may be bound by the binder 21b as illustrated in FIG. 2.

As such, the first slurry or composition may be coated on the substrate 10 and dried to form the first electrolyte layer 21, and the first electrolyte layer 21 may be in a state of having the substrate 10 attached to a first surface thereof.

According to an exemplary embodiment, the first slurry or composition may be coated to form the first electrolyte layer having a predetermined thickness t1. Preferably, the predetermined thickness (t1) may range from about 0.5 μm to about 30 μm on the substrate 10. The method of coating may not be particularly limited and generally used coating methods in the art may be used without limitation. For example, the first slurry or composition may be coated using a doctor blade and subsequently dried at a temperature of about 90 to 130° C. under an atmosphere containing moisture of about 1 ppm or less for about 1 to 6 hours to form the first electrolyte layer 21 on the substrate 10.

The first solvent may not react with the first electrolyte and suitably may have a viscosity of about 1.3 cp at a temperature of about 300 K or greater.

For example, dodecane may be used as the first solvent and poly(ethylene-co-propylene-co-5-methylene-2-norbornene) may be used as the first binder, however, examples are not limited thereto.

According to an exemplary embodiment, the first binder solution may be prepared by mixing an amount of about 0 to 2 wt % (excluding 0 wt %) of the first binder based on the total weight of the first solvent to the first solvent and heating the mixture at a temperature of about 40° C., as stirring and/or sonicating the mixture. Thus, the first binder solution may include content of the first binder less than the content of a binder in conventional electrolyte layer of the conventional all-solid state battery. As such, the substrate 10 as described hereinafter may be easily removed from the electrolyte layer.

The thus prepared first binder solution comprising the first binder in an amount of about 0 to 0.2 wt % (not including 0) based on the total weight of the first binder solution may be added to and mixed with the first solid electrolyte (e.g. a solid powder) to prepare the first slurry or composition having a solid content of about 50 to 70 wt % based on the total weight of the first slurry or composition.

The substrate 10 suitably may be formed of any one of aluminum (Al) and nickel (Ni).

Forming Second Electrolyte Layer

Figure 3:
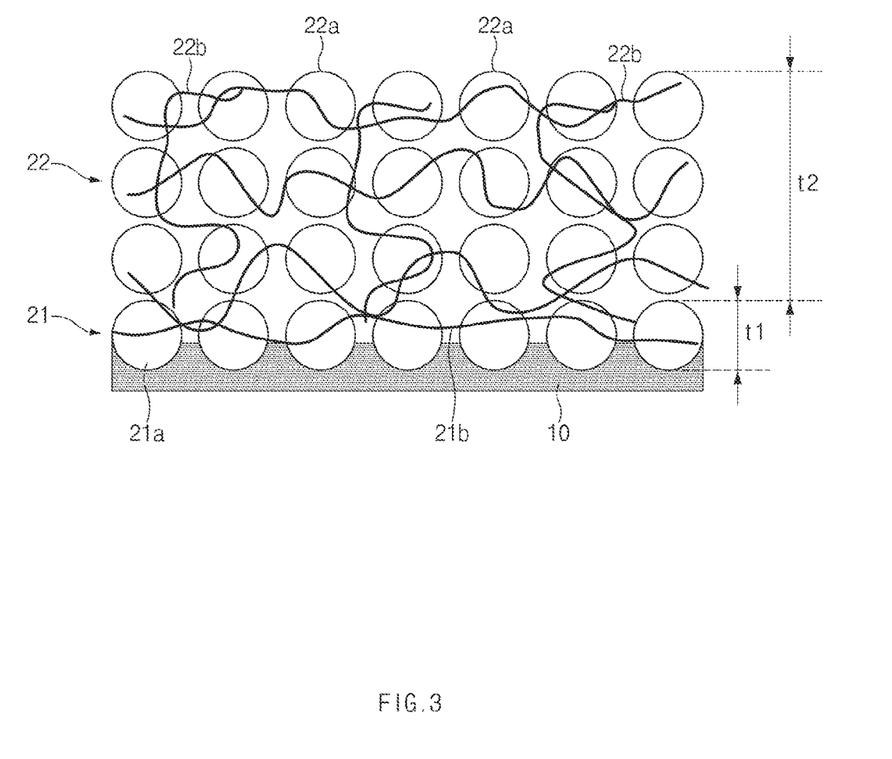
FIG. 3 shows an exemplary process of forming a second electrolyte layer in a method of manufacturing an all-solid state battery according to an exemplary embodiment of the present invention.

As shown in FIG. 3, the second composition or slurry may be uniformly coated on the first electrolyte layer 21 and dried to form a second electrolyte layer 22 having a predetermined thickness (t2) on the other surface of the first electrolyte layer 21 (operation S2).

The second composition or slurry may include an electrolyte in a solid powder state and a second binder solution. The second binder solution may be prepared by mixing a second binder and a second solvent. Thus, the second electrolyte layer 22 may be formed as electrolyte particles 22a are attached or bound by the binder 22b as illustrated in FIG. 3.

Accordingly, the second composition or slurry may be coated on the first electrolyte layer 21 and subsequently dried to form the second electrolyte layer 22, and the first electrolyte layer 21 may be integrally formed on a first surface of the second electrolyte layer 22, or in other words, the second electrolyte layer 22 may be formed on a second surface of the first electrolyte layer 21 having opposite polarity to the first surface where the substrate contacts. A bonding surface to which a first electrode layer 31 as described hereinafter is bonded may be formed on the other surface (a second surface) of the second electrolyte layer 22.

According to an exemplary embodiment, the second electrolyte layer 22 may be formed on the other surface (a second surface) of the first electrolyte layer 21 by coating the second composition or slung. The formed second electrolyte layer 22 may have the predetermined thickness (t2) ranging from about 50 to about 80 μm on the substrate 10. The coating methods of the second slurry or composition are not to particularly limited. For example, the coating may be suitably performed using a doctor blade and subsequently drying the second slurry or composition at a temperature of about 90 to 130° C. under an atmosphere containing moisture of about 1 ppm or less for about 3 to 8 hours.

The second solvent may not react to a second electrolyte and may have a viscosity of about 1.3 cp at a temperature of about 300 K or greater.

According to an exemplary embodiment, dodecane may be used as the second solvent and poly(ethylene-co-propylene-co-5-methylene-2-norbornene) may be used as the second binder.

According to an exemplary embodiment, the second binder solution may be prepared by mixing an amount of about 2 to 10 wt % of the second binder based on the total weight of the second solvent to the second solvent and heating the mixture at a temperature of about 40° C., while stirring the mixture through sonication. Thus, the second binder solution may have a content of the second binder similar to that of the conventional electrolyte layer of the related art all-solid state battery, thereby making bonding with the electrode layer 31 as described hereinafter stable and firm.

The second binder solution including an amount of about 0.5 to 3 wt % of the second binder based on the total weight of the second binder solution may be added to and mixed with the second solid electrolyte (e.g. a solid powder state) to prepare the second slurry or composition having the solid content of about 40 to 70 wt % based on the total weight of the second slurry or composition.

As can be seen from the above descriptions, the first slurry or composition of the first electrolyte layer 21 may have the content of the first binder less than the content of the second binder of the second slurry or composition of the second electrolyte layer 22.

In addition, the thickness t1 of the first electrolyte layer 21 may be less than the thickness t2 of the second electrolyte layer 22. In particular, the thickness t1 of the first electrolyte layer 21 may be appropriately adjusted to facilitate removal (delamination) of the substrate 10 as described hereinafter and stably maintain bonding force with respect to the second electrolyte layer 22.

Laminating Electrolyte Layer and Electrode Layer

Figure 4:
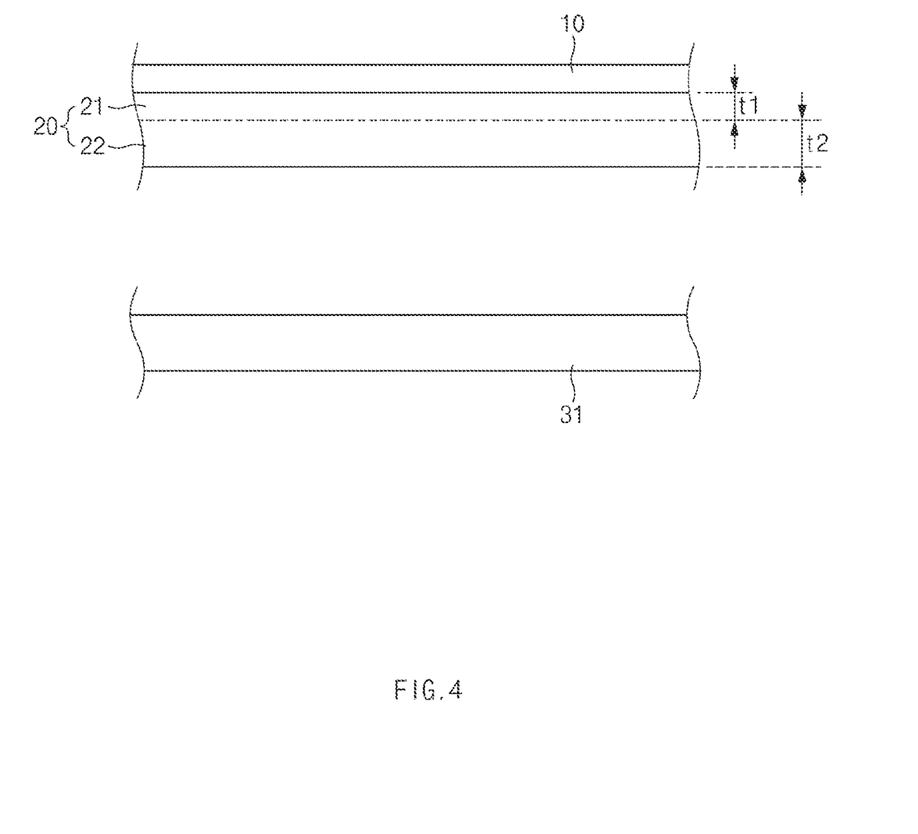
FIG. 4 shows an exemplary process of laminating an electrolyte layer and an electrode layer in a method of manufacturing an all-solid state battery according to an exemplary embodiment of the present invention.

As the second electrolyte layer 22 is integrally formed on the second surface of the first electrolyte layer 21, the first electrolyte layer 21 and the second electrolyte layer 22 may be stacked to form an electrolyte layer 20 as shown in FIG. 4. Subsequently, an electrode layer may be laminated on the second surface of the second electrolyte layer 22 of the electrolyte layer 20 (operation S3). Here, the electrode layer 31 may be configured as any one of a positive electrode and a negative electrode.

First Bonding

Figure 5:
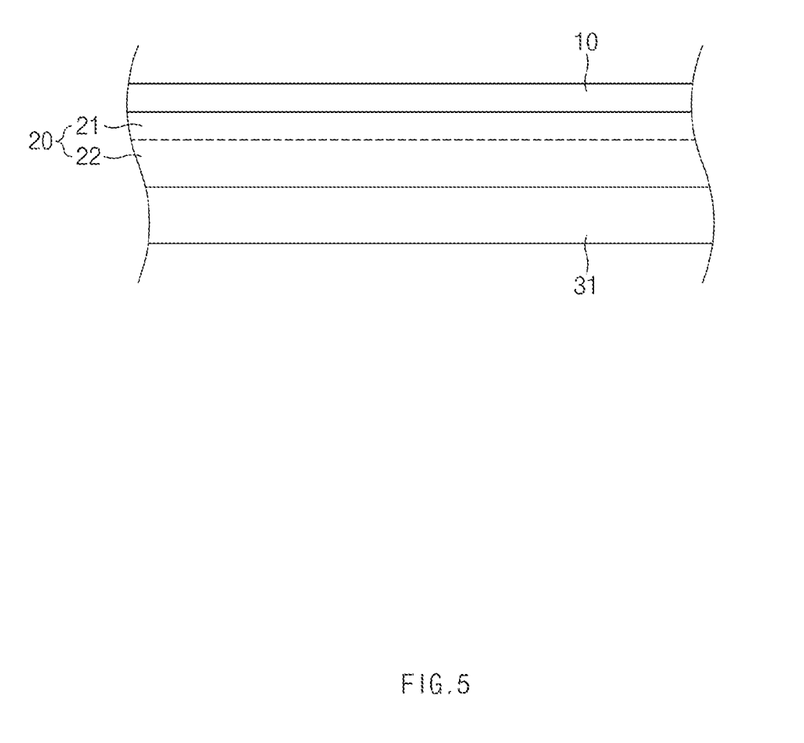
FIG. 5 shows an exemplary process of bonding an electrode layer to a second electrolyte layer of an electrolyte layer in a method of manufacturing an all-solid state battery according to an exemplary embodiment of the present invention.

The laminated electrolyte layers 20 and the electrode layer 31 may be bonded by applying a pressure of about 5 to 20 MPa (operation S4).

Removal of Substrate

Figure 6:
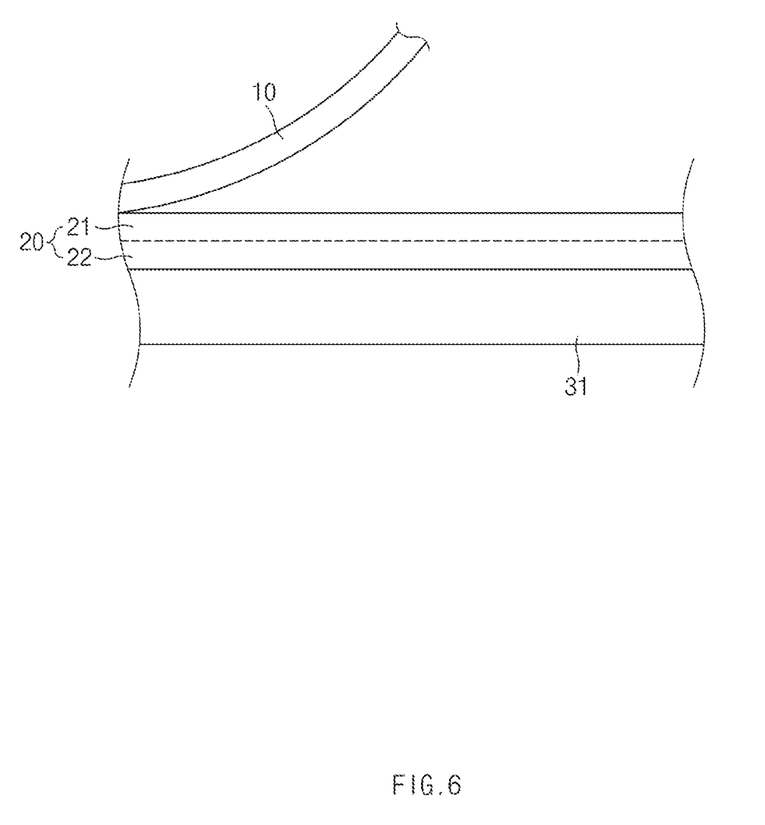
FIG. 6 shows an exemplary process of removing a substrate from a first electrolyte layer of an electrolyte layer in a method of manufacturing an all-solid state battery according to an exemplary embodiment of the present invention.

After the electrode layer 31 is bonded to the second electrolyte layer 22 of the electrolyte layer 20, the substrate 10 may be removed from the first surface of the first electrolyte layer 21 as illustrated in FIG. 6 (operation S5).

Second Bonding

Figure 7:
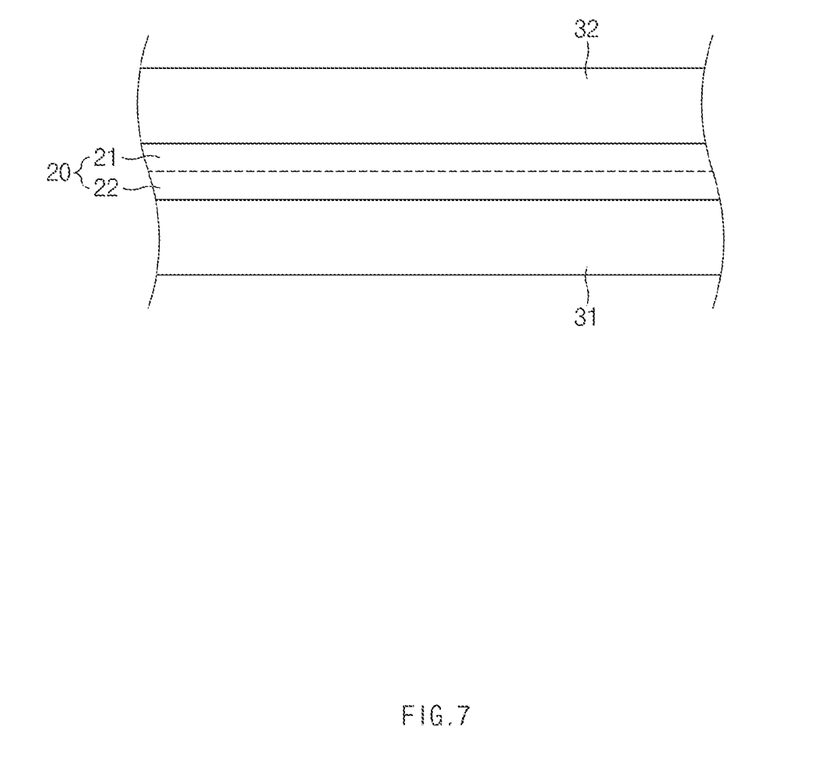
FIG. 7 show an exemplary process of bonding an electrode layer to a first electrolyte layer of an electrolyte layer in a method of manufacturing an all-solid state battery according to an exemplary embodiment of the present invention.

An electrode layer 32 having opposite polarity to that of the electrode layer 31 (counter electrode) as described above may be bonded to the first surface of the first electrolyte layer 21 where the substrate 10 is removed, for example, by applying a pressure of about 25 to 40 MPa (operation S6). For example, when the electrode layer 31 bonded in the first bonding operation S5 is a positive electrode, the electrode layer 32 bonded in the second bonding operation S6 may be a negative electrode, and conversely, when the electrode layer 31 bonded in the first bonding operation S5 is a negative electrode, the electrode layer 32 bonded in the second bonding operation S6 may be a positive electrode.

Preparation of the Electrode Layers

The electrode layers 31 and 32 may be manufactured before the formation of the electrolyte layer 20.

According to an exemplary embodiment, the electrode layers 31 and 32 may be configured as a positive electrode complex or a negative electrode complex. A manufacturing process of the electrode layers 31 and 32 will be described in detail as follows.

First, an amount of 50 to 85 wt % of positive electrode or negative electrode active material, an amount of 35 to 15 wt % of a solid electrolyte, and an amount of 2 to 5 wt % of conductive material based on the total weight of the of the mixture may be mixed through a tube mixer or milling.

Subsequently, the mixture may be mixed using any one of mortar, non-bubbling kneader, a lanetary mixer, and a vortex mixer for the second time to form an electrode complex.

A binder solution containing an amount of about 1 to 10 wt % of a third binder, a third solvent, and the like, may be added to the electrode complex and mixed to form slurry having an amount of about 40 to 70 wt % of solid content based on the total weight of the slurry. The slurry having a set thickness ranging from about 100 to about 500 μm may be coated on a substrate using a doctor blade, and the coated positive electrode or negative electrode complex may be dried at a temperature of about 90 to 130° C. in a vacuum oven for about 1 to 6 hours to manufacture a positive electrode layer and a negative electrode layer. The substrate suitably may be formed of any one of Al, C—Al, Ni, and Cu foils.

The first slurry or composition of the first electrolyte layer 21 may have a content of the first binder to less than the content of the second binder of the second slurry or composition of the second electrolyte layer 22, and thus, may have reduced viscosity thereof. Thus, in the first electrolyte layer forming operation S1 as described above, coating of the first slurry or composition to form the first electrolyte layer 21 may be performed through electrospray deposition. As the coating of the first slurry or composition is performed through electrospray deposition, the thickness t1 of the first electrolyte layer 21 may be uniformly and stably formed.

The second electrolyte layer 22 has content of the second binder similar to that of the conventional electrolyte layer of the related art all-solid state battery. In the second electrolyte layer forming operation S2 as described above, coating of the second slurry or composition to form the second electrolyte layer 22 may be performed through any one coating technique among die coating, comma coating, and Gravure coating.

Accordingly, according to various exemplary embodiments of the present invention, since the content of the binder of the first slurry or composition is less than the content of the binder of the second slurry or composition, the first electrolyte layer 21 may have less adhesion than that of the second electrolyte layer 22, and thus, the substrate 10 attached to the first surface of the first electrolyte layer 21 may be easily removed, thereby securing safety of the lamination process, which is thus being advantageous to secure quality.

In addition, since the electrolyte layer 20 is configured by sequentially forming the first electrolyte to layer 21 and the second electrolyte layer 22, a thickness of the electrolyte layer 20 may be uniformly implemented, thereby distributing a uniform current to significantly enhance performance of the battery.

In particular, interfacial resistance between the electrode layer 31 and the electrolyte layer 20 may be minimized by appropriately adjusting a thickness of the first electrolyte layer 21 having relatively less content of the binder.

As described above, according to various exemplary embodiments of the present invention, by forming the electrolyte layer having a structure in which two or more electrolyte layers having different contents of binders are laminated, the substrate may be smoothly removed from the electrolyte layer and the interface between the electrolyte layer and the electrode layer may be smoothly formed when a laminating technique is applied.

Hereinabove, although the present invention has been described with reference to exemplary embodiments and the accompanying drawings, the present invention is not limited thereto, but may be variously modified and altered by those skilled in the art to which the present invention pertains without departing from the spirit and scope of the present disclosure claimed in the following claims.

What is claimed is:

1. An electrolyte layer for an all-solid state battery comprising:
    a first electrolyte layer disposed on a substrate, the first electrolyte layer including a first solid electrolyte and a first binder; and
    a second electrolyte layer disposed on the first electrolyte layer, the second electrolyte layer including a second solid electrolyte and a second binder,
    wherein a content of the first binder of the first electrolyte layer is less than a content of the second binder of the second electrolyte layer, such that the first electrolyte layer has less adhesion than that of the second electrolyte layer.

2. The electrolyte layer according to claim 1, wherein the two or more electrolyte layers have different thicknesses.

3. A method of manufacturing an all-solid state battery, the method comprising:
    coating a first slurry or composition on a substrate to form a first electrolyte layer having a thickness (t1);
    coating a second slurry or composition on the first electrolyte layer to form a second electrolyte layer having a thickness (t2);
    laminating an electrode layer on the second electrolyte layer;
    bonding the electrode layer to the second electrolyte layer; and
    removing the substrate from the first electrolyte layer,
    wherein a content of a first binder included in the first slurry or composition to form the first electrolyte layer is less than a content of a second binder included in the second slurry or composition to form the second electrolyte layer, such that the first binder has less adhesion than that of the second electrolyte layer.

4. The method according to claim 3, wherein the thickness of the first electrolyte layer (t1) is less than the thickness of the second electrolyte layer (t2).

5. The method according to claim 3, wherein the first slurry or composition is coated on the substrate by electrospray deposition.

6. The method according to claim 3, wherein the second slurry or composition is coated on the first electrolyte layer by die coating, comma coating, or Gravure coating.

7. The method according to claim 3, wherein the electrode layer is a positive electrode, and after removing the substrate from the first electrolyte layer, an additional electrode layer of a negative electrode is laminated to the first electrolyte layer from which the substrate is removed.

8. The method according to claim 3, wherein the electrode layer is a negative electrode, and after removing the substrate from the first electrolyte layer, an additional electrode layer of a positive electrode is laminated to the first electrolyte layer from which the substrate is removed.

9. A vehicle that comprises an all-solid state battery of claim 1.

10. A vehicle that comprises an all-solid state battery manufactured by a method of claim 3.

* * * * *